United States Patent
Kay (10) Patent No.: US 7,315,572 B2
(45) Date of Patent: Jan. 1, 2008

(54) CABLE MODEM THAT CAN PREVENT MODEM SIGNAL FROM TRANSFERRING TO AN HFC NETWORK WHEN INTERNAL CIRCUIT OF THE CABLE MODEM OPERATES ABNORMALLY

(75) Inventor: Shin-Woong Kay, Sungnam (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 752 days.

(21) Appl. No.: 10/774,453

(22) Filed: Feb. 10, 2004

(65) Prior Publication Data

US 2004/0163119 A1    Aug. 19, 2004

(30) Foreign Application Priority Data

Feb. 15, 2003    (KR) ...................... 10-2003-0009645

(51) Int. Cl.
*H04B 1/38*    (2006.01)
(52) U.S. Cl. ..................................... 375/222
(58) Field of Classification Search ................ 375/219, 375/222, 257, 377, 295, 258; 725/74, 111; 379/8, 22.04, 32.01; 455/3.01, 3.02
See application file for complete search history.

(56) References Cited

U.S. PATENT DOCUMENTS

| 5,790,806 | A |  | 8/1998 | Koperda |
|---|---|---|---|---|
| 5,835,125 | A |  | 11/1998 | Bhagavath |
| 6,075,972 | A | * | 6/2000 | Laubach et al. ........... 455/3.05 |
| 6,588,016 | B1 |  | 7/2003 | Chen et al. |
| 6,622,304 | B1 | * | 9/2003 | Carhart ........................ 725/74 |
| 6,662,368 | B1 |  | 12/2003 | Cloonan et al. |
| 6,674,809 | B1 | * | 1/2004 | Kay ........................... 375/285 |
| 6,895,043 | B1 | * | 5/2005 | Naegeli et al. ............. 375/224 |
| 7,159,236 | B2 | * | 1/2007 | Abe et al. .................... 725/111 |

* cited by examiner

*Primary Examiner*—Khanh C. Tran
(74) *Attorney, Agent, or Firm*—Robert E. Bushnell, Esq.

(57) ABSTRACT

A cable modem includes a CPU for controlling the entire cable modem, a PGC, for generating a modem signal with adjusted intensity, a transformer for isolating the PGC from a next stage, a low pass filter for filtering off a high-frequency component, and a selecting circuit for selectively transferring the output signal form the low pass filter to a network. In particular, the cable modem of the invention is advantageous for preventing an up-stream signal of the cable modem from transferring to an HFC network and for preventing the entire network to be shut down when an internal circuit operates abnormally.

33 Claims, 5 Drawing Sheets

CABLE MODEM THAT CAN PREVENT MODEM SIGNAL FROM TRANSFERRING TO AN HFC NETWORK WHEN INTERNAL CIRCUIT OF THE CABLE MODEM OPERATES ABNORMALLY

CLAIM OF PRIORITY

This application makes reference to, incorporates the same herein, and claims all benefits accruing under 35 U.S.C. §119 from an application entitled "CABLE MODEM THAT CAN PREVENT MODEM SIGNAL FROM TRANSFERRING TO THE HFC NETWORK WHEN INTERNAL CIRCUIT OF THE CABLE MODEM OPERATES ABNORMALLY" earlier filed in the Korean Intellectual Property Office on 15 Feb. 2003 and thereby duly assigned Serial No. 2003-9645.

BACKGROUND OF THE INVENTION

1. Field of the Invention

The present invention relates to a cable modem, and more particularly to a cable modem that can prevent a modem signal from transferring to an HFC (Hybrid Fiber Coaxial Network) when an internal circuit of the cable modem operates abnormally.

2. Description of the Related Art

An HFC network using a cable modem is a shared media network, meaning that if an unwanted signal comes from a cable modem connected to a network, or if the cable modem operates abnormally and thus, generates a signal with a particular frequency, the entire system is fatally influenced and in the worst case, the network is likely to be shut down. A related art cable modem controls the transferring of a burst signal to the HFC network, by using an enable signal of a PGC (Programmable Gain Controller) that adjusts or controls signal intensity of the cable modem.

A burst signal is used for an up-stream signal of the cable modem to reduce the influence of an unwanted signal on the HFC network using the shared media. The enable signal of the PGC is used to turn on and turn off the burst signal. Therefore, if there is any type of error in the enable signal EN1, an unwanted burst signal of the cable modem flows in the HFC network, causing the entire network to be shut down.

SUMMARY OF THE INVENTION

Accordingly, one object of the present invention is to solve the foregoing problems by providing a cable modem that prevents the entire network from being shut down because of an unwanted modem signal transferred to the HFC network when an internal circuit operates abnormally.

It is another object to provide a cable modem of the present invention that can be advantageously used for preventing an up-stream signal of the cable modem from transferring to the HFC network.

It is yet another object to provide an efficient manner of preventing an entire network to be shut down when an internal circuit operates abnormally and yet be easy and inexpensive to implement.

The foregoing and other objects and advantages are realized by providing a cable modem, which includes: a CPU (Central Processing Unit) for controlling the entire cable modem, generating a first enable signal and a second enable signal, and outputting a data to a data bus; a PGC, under the control of the first enable signal, for receiving a modem signal, adjusting gain, and generating a modem signal with adjusted intensity; a transformer for receiving an output signal from the PGC and isolating the PGC from a next stage; a low pass filter for receiving an output signal from the transformer and filtering off a high-frequency element; and a selecting circuit for receiving the first and second enable signals and an output signal from the low pass filter, and under the control of the first and second enable signals, selectively transferring the output signal form the low pass filter to a network.

In the exemplary embodiment of the present invention, the selecting circuit includes: an EX-NOR (exclusive NOR) circuit for receiving the first and second enable signals and performing an exclusive NOR operation; and a switching circuit for receiving an output signal of the EX-NOR circuit and the output signal of the low pass filter, and under the control of the output signal of the EX-NOR circuit, selectively transferring the output signal of the low pass filter to the network.

In the exemplary embodiment of the present invention, the switching circuit includes: an NPN transistor having a base terminal to which the output signal from the EX-NOR circuit is applied, and an emitter terminal connected to a ground; a resistor, of which one end being connected to the ground; and a relay having a first terminal connected to a collector terminal of the NPN-type transistor, a second terminal connected to the resistor, a third terminal connected to a supply voltage, a fourth terminal to which the output terminal of the low pass filter is applied, and a fifth terminal to which an output terminal of the switching circuit is connected.

Preferably, the resistance of the switching circuit is 75 Ω(ohms), in consideration of impedance matching.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF EXEMPLARY EMBODIMENTS

Figure 1:
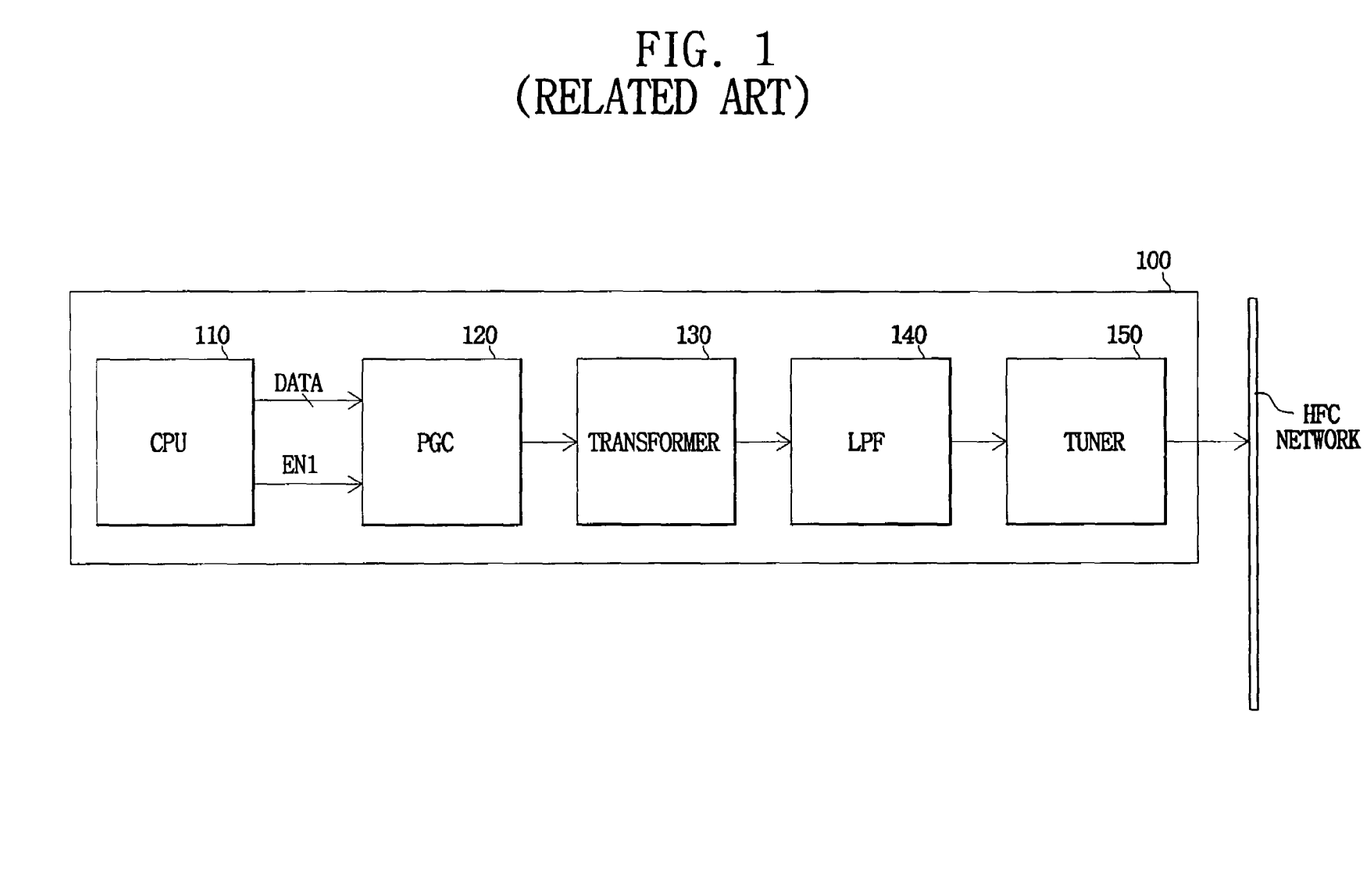
FIG. 1 schematically illustrates a transmission section of a cable modem of the related art.

Turning now to the drawings, FIG. 1 schematically illustrates a transmission section in a cable modem of the related art. The related art cable modem controls the transferring of a burst signal to the HFC network, by using an enable signal EN1 of PGC (Programmable Gain Controller) 120 that adjusts or controls signal intensity of the cable modem.

A burst signal is used for an up-stream signal of the cable modem to reduce the influence of an unwanted signal on the HFC network using the shared media. As shown in FIG. 1, the enable signal EN1 of PGC is used to turn on and turn off the burst signal. Therefore, if there is any type of error in the enable signal EN1, an unwanted burst signal of the cable modem flows in the HFC network, causing the entire network to be shut down.

Reference will now be made in detail to exemplary embodiments of the present invention, which are illustrated in the accompanying drawings.

Figure 2:
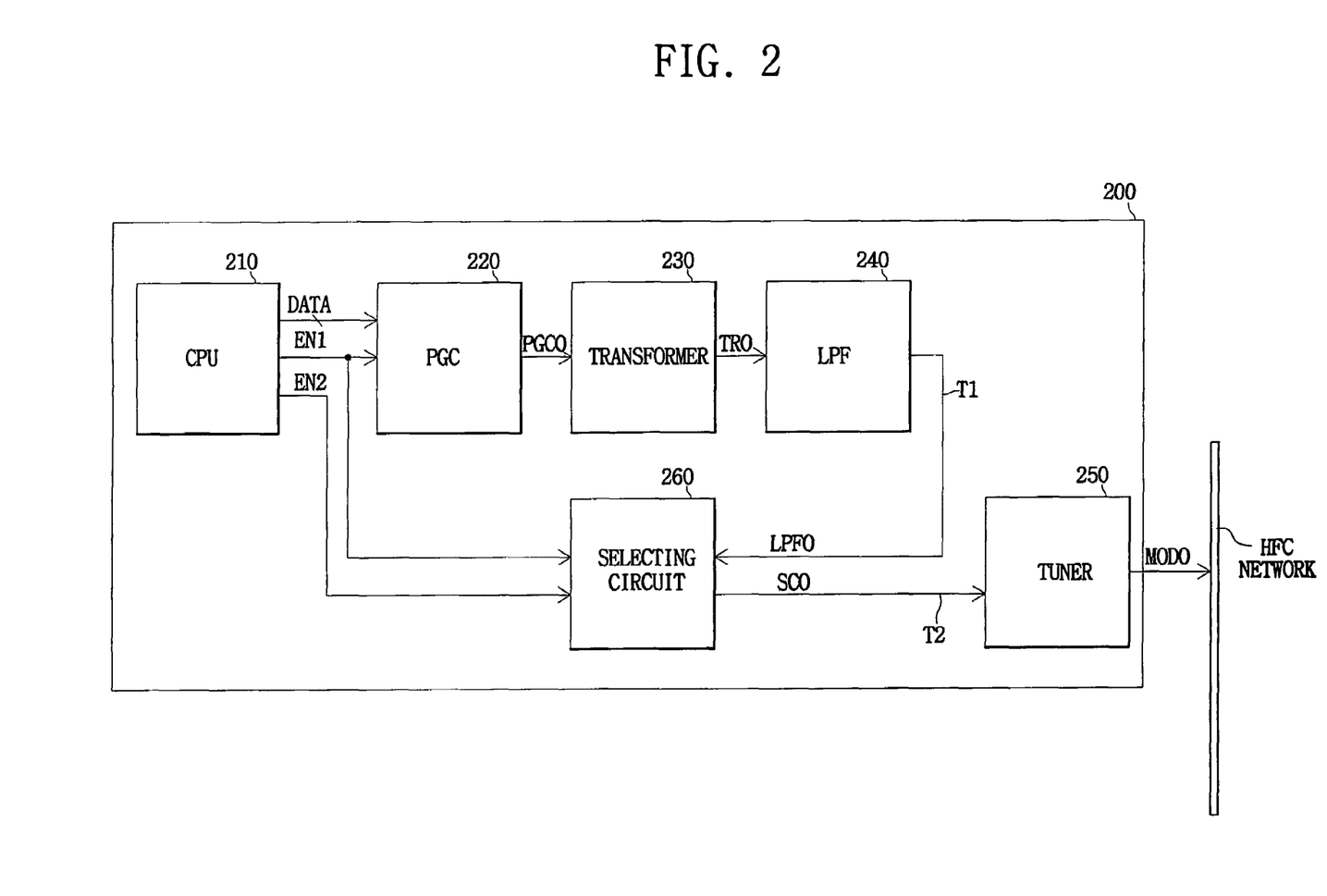
FIG. 2 schematically illustrates a transmission section of a cable modem according to an exemplary embodiment of the present invention.

FIG. 2 illustrates a transmission section of a cable modem according to an exemplary embodiment of the present invention. The cable modem includes a CPU (central processing unit) 210 for controlling the cable modem 200, generating a first enable signal EN1 and a second enable signal EN2, and outputting a data (DATA) to a data bus, a PGC 220 for receiving an up-stream data and adjusting gain, under the control of the first enable signal EN1, a transformer 230 for receiving an output signal PGCO from the PGC (Programmable Gain Controller) and isolating the PGC 220 from a next stage, a low pass filter 240 for receiving an output signal (TRO) of the transformer 230 and filtering off a high-frequency element, a selecting circuit 260 for receiving the first and second enable signals EN1 and EN2 and an output signal (LPFO) of the low pass filter 240, and under the control of the first and second enable signals EN1 and EN2, selectively transferring the output signal LPFO of the low pass filter to the next stage, and a tuner 250 for receiving an output signal SCO of the selection circuit and transferring the signal to an HFC network.

The operation of the transmission section of the cable modem in FIG. 2 is now described.

The cable modem transfers an up-stream signal to the CMTS (Cable Modem Termination System) through the HFC network, and receives a down-stream signal. In particular, the transmission section of the cable modem in FIG. 2 transfers up-stream signals to the CMTS through the HFC network. Intensity of the up-stream signal, namely data, is adjusted by the PGC 200 under the control of the first enable signal EN1. In general, intensity of signal transmitted from the cable modem 200 to the CMTS is not uniform but variable, depending on the CMTS command. This is because the intensity of an up-stream signal should be increased proportionally to the distance between the cable modem and the CMTS. The transformer 230 isolates the PGC 220 from the low pass filter 240. The up-stream signal intensity is adjusted in the PGC 220, and high-frequency elements in the signal are filtered off by the low pass filter 240. Because signals with frequencies in 5-42 MHz (megahertz) band only are appropriate for the up-stream signal, the low pass filter 240 filters off signals having frequencies greater than 42 MHz. The selecting circuit 260, under the control of the first and second enable signals EN1 and EN2, decides whether or not to transfer the output signal LPFO of the low pass filter to the tuner 250. Depending on the status of two enable signals (EN1 and EN2), the output signal LPFO of the low pass filter is applied to an output terminal T2 of the selecting circuit 260, or the output terminal T2 floats. The output signal SCO of the selecting circuit is loaded on the HFC network through the tuner 250.

In short, the selecting circuit 260 mounted in the cable modem plays a key role for preventing the up-stream signal from transferring to the HFC network when the internal circuit, particularly the PGC 220, operates abnormally.

Figure 3:
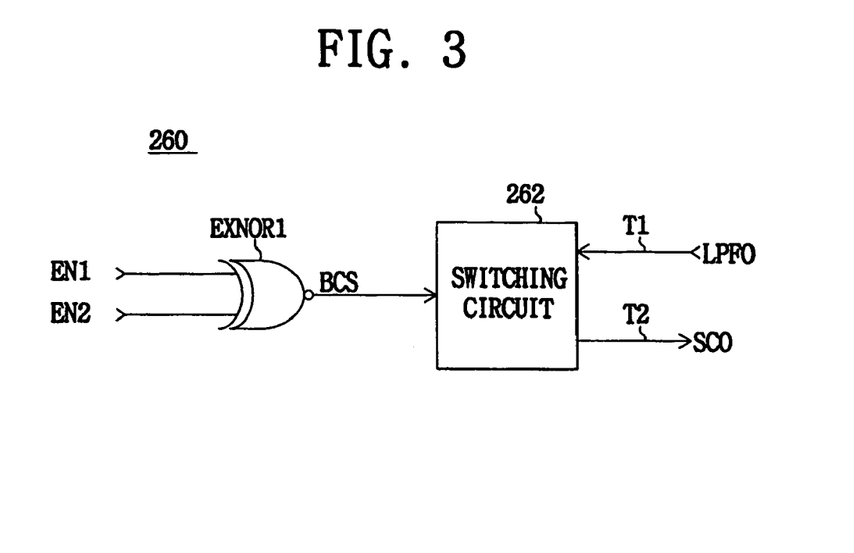
FIG. 3 is a detailed diagram of a selecting circuit of the cable modem in FIG. 2.

FIG. 3 is a detailed diagram of a selecting circuit of the cable modem in FIG. 2. The selecting circuit 260 in FIG. 2 consists of an EX-NOR (exclusive NOR) circuit EXNOR1 for receiving the first and second enable signals EN1 and EN2 and for performing an exclusive NOR operation, and a switching circuit 262 for receiving the output signal BCS of the EX-NOR circuit EX-NOR1 and the output signal LPFO of the low pass filter, and under the control of the output signal BCS of the EX-NOR circuit EXNOR1, outputting the output signal LPFO of the low pass filter 240 in FIG. 1.

The operation of the selecting circuit 260 of the cable modem in FIG. 3 is now explained.

When both first enable signal EN1 and second enable signal EN2 are in a "high" or "low" state, the output signal BCS of the EX-NOR circuit EXNOR1 puts in a high state, and the output signal LPFO of the low pass filter is output as an output signal SCO of the selecting circuit. On the other hand, if only one of the first enable signal EN1 and the second enable signal EN2 is in a "high" or "low" state, the output signal BCS of the EX-NOR circuit EXNOR1 puts in a low state, and the output signal LPFO of the low pass filter is not output as an output signal SCO of the selecting circuit. At this time, the output terminal T2 of the selection circuit 260 floats.

Figure 4:
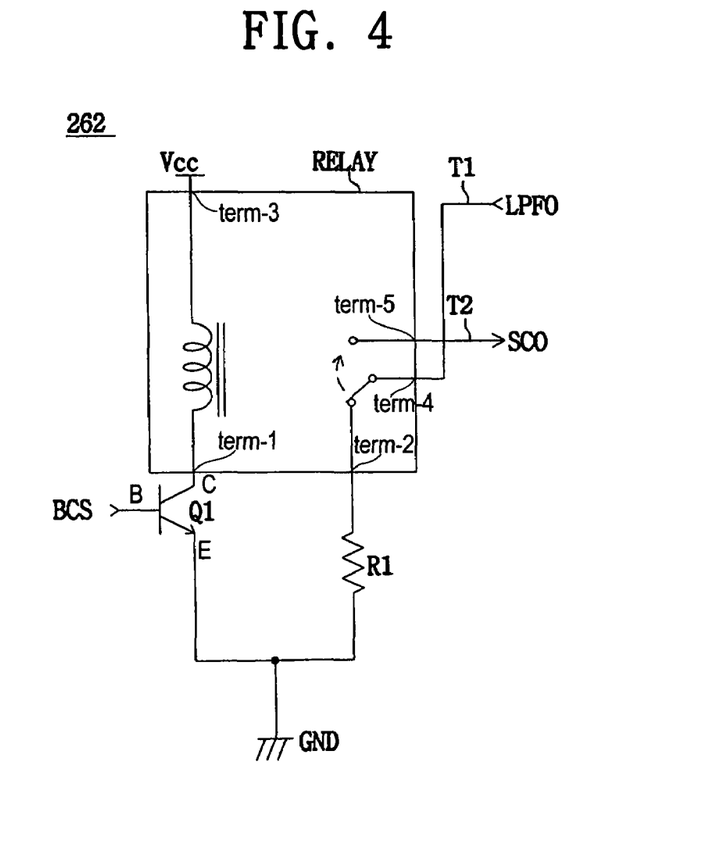
FIG. 4 is a detailed diagram of a switching circuit of the selecting circuit in FIG. 3.

FIG. 4 is a detailed diagram of a switching circuit of the selecting circuit in FIG. 3. The switching circuit in FIG. 4 includes an NPN transistor Q1 having a base terminal (B) to which the output signal BCS of the EX-NOR circuit EXNOR1 in FIG. 3 is applied, and an emitter terminal (E) connected to a ground, a resistor R1 of which one end being connected to the ground, and a relay having a first terminal (term-1) connected to a collector terminal (C) of the NPN transistor Q1, a second terminal (term-2) connected to the resistor R1, a third terminal (term-3) connected to a supply voltage Vcc, a fourth terminal (term-4) into which the output signal LPFO of the low pass filter 240 in FIG. 2 is input, and a fifth terminal (term-5) from which the output signal SCO of the switching circuit 262 is output.

The operation of the switching circuit 262 in FIG. 4 is now discussed in the following.

If the output signal BCS of the EX-NOR circuit EXNOR1 in FIG. 3 is in a "high" state, the NPN transistor Q1 is turned on, and the RELAY connects an output terminal T1 of the low pass filter 240 in FIG. 2 to an input terminal T2 of the tuner 250 in FIG. 2. At this point, the output signal LPFO of the low pass filter 240 in FIG. 2 is output as the output signal SCO of the selecting circuit. Meanwhile, if the output signal BCS of the EX-NOR circuit EXNOR1 in FIG. 3 is in a "low" state, the NPN transistor Q1 is turned off, and the relay connects the output terminal T1 of the low pass filter 240 in FIG. 2 to the resistor R1. At this point, the output signal LPFO of the low pass filter 240 in FIG. 2 is not output as the output signal SCO of the selecting circuit, and the output terminal T1 of the low pass filter 240 in FIG. 2 is connected to the ground via the resistor R1.

Even though the first enable signal EN1 is inevitably in a "high" state, as long as the second enable signal is in a "low" state, the NPN transistor Q1 is not turned on. Hence, the up-stream signal of the cable modem is not really loaded on the HFC network via the tuner. However, if the same thing happens to the related art circuit, that is, if the first enable signal EN1 is inevitably in a "high" state (this corresponds to an abnormal operation), an up-stream signal of the cable modem is loaded on the HFC network via the tuner, and as a result, the entire HFC network could be fatally influenced. In addition, if the first and second enable signals EN1 and EN2 are in a "low" state, the NPN transistor Q1 might be turned on, but an internal switch of the PGC 220 remains to be off. Therefore, an up-stream signal of the cable modem does not flow in the HFC network via the tuner.

Because input/output impedance of a coaxial system is normally 75 Ω(ohms), the resistance of 75 Ω is used for the resistor R1, for sake of impedance matching.

As discussed before, when the cable modem operates normally, the enable signals EN1 and EN2 are all enabled, and the output signal BCS of the EX-NOR circuit EXNOR1 in FIG. 3 is in a "high" state. Accordingly, the NPN transistor Q1 is turned on. At this time, the relay is turned on, the output terminal T1 of the low pass filter 240 in FIG. 2 is connected to the input terminal T2 of the tuner 250 in FIG. 2, and thus, the output signal LPFO of the low pass filter is transferred to the HFC network via the tuner 250. However, when the cable modem operates abnormally, causing only one of the enable signals EN1 and EN2 to be enabled, the output signal of the EX-NOR circuit EXNOR1 in FIG. 3 is put in a "low" state. As a result, the NPN-type transistor Q1 is turned off. In this case, the relay is turned off, and the output terminal T1 of the low pass filter 240 in FIG. 2 is connected to a ground GND via the resistor R1. Also, the input terminal T2 of the tuner 250 floats, and the output signal LPFO of the low pass filter is not transferred to the HFC network.

Figure 5:
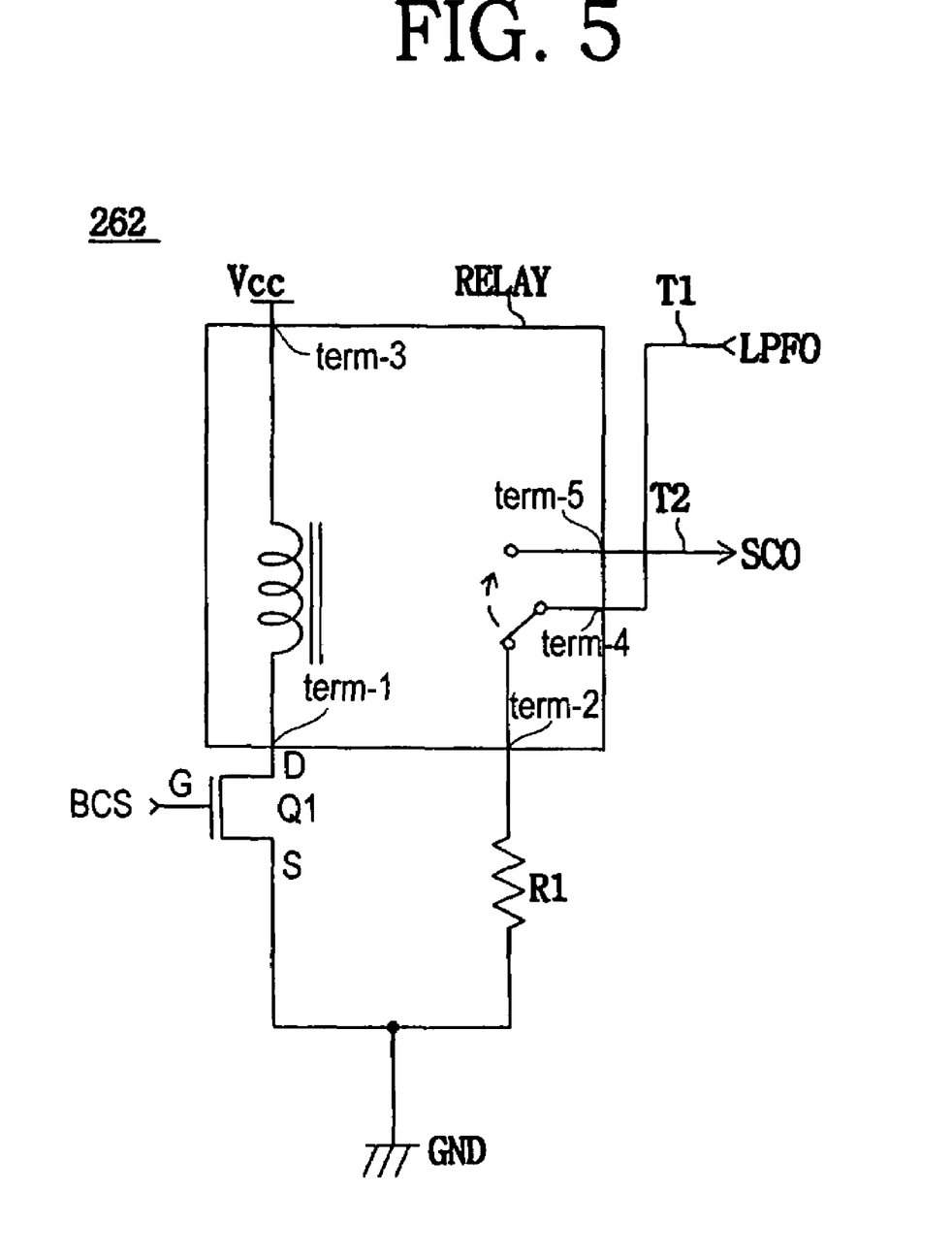
FIG. 5 is a detailed diagram of a switching circuit of the selecting circuit in FIG. 3 with an NMOS transistor.

The transistor Q1 of FIG. 4 can also be an NMOS (n-channel Metal-Oxide Semiconductor). As seen in FIG. 5, an n-channel metal-oxide semiconductor transistor Q1 has a gate terminal (G) to which the output signal (BCS) of the EX-NOR circuit is applied, and a source terminal (S) connected to a ground GND. The resistor R1 has one end connected to the ground. The relay (RELAY) has a first terminal (term-1) connected to a drain (D) terminal of the n-channel metal-oxide semiconductor transistor Q1, a second terminal (term-2) connected to the resistor R1, a third terminal (term-3) connected to a supply voltage Vcc, a fourth terminal (term-4) to which the modem signal with adjusted intensity is applied (LPFO), and a fifth terminal (term-5) from which the output signal SCO of the switching circuit 262 is output.

Figure 6:
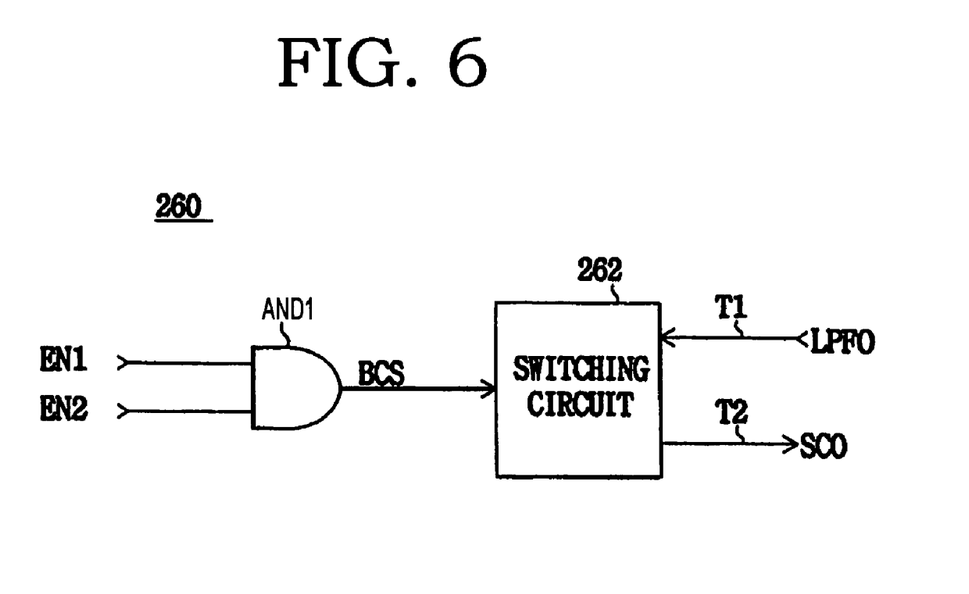
FIG. 6 is an alternative detailed diagram of the selecting circuit of the cable modem in FIG. 2.

An AND gate can also be used in addition to the exclusive-NOR gate described above. As seen for example in FIG. 6, a two input AND gate (AND1) exhibits an output in a high state only when both inputs EN1 and EN2 are in a high state.

The present invention can be realized as computer-executable instructions stored in computer-readable media. The computer-readable media includes all possible kinds of recording media in which computer-readable data is stored. The computer-readable media include storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), system memory (read-only memory, random access memory), flash memory, and carrier waves (e.g., transmission via the Internet). Also, the computer-readable media can store and execute computer-readable codes that are distributed in computers connected via a network.

In conclusion, the cable modem of the present invention can be advantageously used for preventing an up-stream signal of the cable modem from transferring to the HFC network and for preventing the entire network to be shut down when an internal circuit operates abnormally.

While the present invention has been particularly shown and described with reference to exemplary embodiments thereof, it will be understood by those skilled in the art that the foregoing and other changes in form and details may be made therein without departing from the spirit and scope of the present invention.

What is claimed is:

1. A cable modem, comprising:
   a central processing unit for controlling the entire cable modem, generating a first enable signal and a second enable signal, and outputting data to a data bus;
   a programmable gain controller, under the control of said first enable signal, for receiving a modem signal, adjusting gain, and generating a modem signal with adjusted intensity; and
   a selecting circuit for receiving said first and second enable signals and the modem signal with adjusted intensity, and under the control of said first and second enable signals, selectively transferring the modem signal with adjusted intensity to a network.

2. The cable modem according to claim 1, further comprising:
   a tuner for receiving an output signal of said selecting circuit and transferring the output signal to said network.

3. The cable modem according to claim 1, wherein the selecting circuit transfers the modem signal with adjusted intensity to the network when both first and second enable signals are in a "high" or "low" state, and does not transfer the modem signal with adjusted intensity to said network when said first enable signal and said second enable signal are in a different state from each other.

4. The cable modem according to claim 1, wherein the selecting circuit is comprised of:
   an exclusive NOR circuit for receiving said first and second enable signals and performing an exclusive NOR operation; and
   a switching circuit for receiving an output signal of said exclusive NOR circuit and the modem signal with adjusted intensity, and under the control of the output signal of said exclusive NOR circuit, selectively transferring the modem signal with adjusted intensity to said network.

5. The cable modem according to claim 4, wherein the switching circuit is comprised of:
   an NPN transistor including abase terminal to which the output signal of said exclusive NOR circuit is applied, and an emitter terminal connected to a ground;
   a resistor including one end being connected to the ground; and
   a relay including a first terminal connected to a collector terminal of said NPN-type transistor, a second terminal connected to said resistor, a third terminal connected to a voltage supply, a fourth terminal to which the modem signal with adjusted intensity is applied, and a fifth terminal to which an output terminal of said switching circuit is connected.

6. The cable modem according to claim 4, wherein the switching circuit is comprised of:
   an n-channel metal-oxide semiconductor transistor having a gate terminal to which the output signal of said exclusive NOR circuit is applied, and a source terminal connected to a ground;
   a resistor, of which one end being connected to the ground; and
   a relay including a first terminal connected to a drain terminal of said n-channel metal-oxide semiconductor transistor, a second terminal connected to said resistor, a third terminal connected to a supply voltage, a fourth terminal to which the modem signal with adjusted intensity is applied, and a fifth terminal to which an output terminal of the switching circuit is connected.

7. The cable modem according to claim 5, wherein the resistance is 75Ω(ohms).

8. The cable modem according to claim 6, wherein the resistance matches input and output impedance of a coaxial system of the network.

9. The cable modem according to claim 1, wherein the network is a hybrid fiber coaxial network.

10. The cable modem according to claim 1, further comprising a filter unit filtering high-frequency elements of the modem signal with adjusted intensity from said programmable gain controller.

11. The cable modem according to claim 1, further comprising a transformer receiving the modem signal from said programmable gain controller before being sent to said selecting circuit and said transformer isolating said programmable gain controller from a next stage.

12. The cable modem according to claim 4, wherein the switching circuit is comprised of:
a transistor including a first electrode of a principal electrically conducting channel, a second electrode of said principal electrically conducting channel, and a control electrode, said control electrode regulating a current flow between said first electrode and said second electrode of said principal electrically conducting channel, said control electrode to which the output signal of said exclusive NOR circuit is applied, and said second electrode connected to a ground;
a resistor including one end being connected to the ground; and
a relay including a first terminal connected to said first electrode of said transistor, a second terminal connected to said resistor, a third terminal connected to a voltage supply, a fourth terminal to which the modem signal with adjusted intensity is applied, and a fifth terminal to which an output terminal of said switching circuit is connected.

13. The cable modem according to claim 12, further comprised of said first and second electrodes being of an n-type material.

14. The cable modem according to claim 13, with said first terminal and said third terminal being associated with an operating coil of said relay.

15. The cable modem according to claim 13, with said fifth terminal, fourth terminal and second terminal being associated with an armature of said relay accommodating an electrical contact from said fourth terminal to either said second terminal or said fifth terminal.

16. The cable modem according to claim 15, with the output signal of said exclusive NOR circuit being in a "high" state, said transistor is turned on, and said relay connects said fifth terminal to said fourth terminal accommodating said modem signal with adjusted intensity being transferred to said network.

17. The cable modem according to claim 1, wherein the selecting circuit transfers the modem signal with adjusted intensity to the network when both first and second enable signals are in a "high", and does not transfer the modem signal with adjusted intensity to said network when said first enable signal and said second enable signal are in a different state from each other.

18. The cable modem according to claim 17, wherein when said first and second enable signals are in a "low" state, an internal switch of said programmable gain controller remains to be off and the modem signal does not flow to said network.

19. The cable modem according to claim 1, wherein the selecting circuit is comprised of:
an AND circuit for receiving said first and second enable signals and performing an AND operation; and
a switching circuit for receiving an output signal of said AND circuit and the modem signal with adjusted intensity, and under the control of the output signal of said AND circuit, selectively transferring the modem signal with adjusted intensity to said network.

20. The cable modem according to claim 1, wherein the selecting circuit is comprised of:
a first circuit for receiving said first and second enable signals and outputting a signal in a high state only when both first and second enabling signals are in a high state; and
a switching circuit for receiving the output signal of said first circuit and the modem signal with adjusted intensity, and under the control of the output signal of said first circuit, selectively transferring the modem signal with adjusted intensity to said network.

21. A cable modem, comprising:
a central processing unit for controlling said cable modem, generating a first enable signal and a second enable signal, and outputting data to a data bus;
a programmable gain controller, under the control of said first enable signal, for receiving a modem signal, adjusting gain, and generating a modem signal with adjusted intensity;
a transformer for receiving an output signal of said programmable gain controller and isolating said programmable gain controller from a next stage;
a low pass filter for receiving an output signal of said transformer and filtering off a high-frequency element; and
a selecting circuit for receiving said first and second enable signals and an output signal of said low pass filter, and under the control of said first and second enable signals, selectively transferring the output signal of said low pass filter to a network.

22. The cable modem according to claim 21, further comprising:
a tuner for receiving an output signal of said selecting circuit and transferring the output signal to said network.

23. The cable modem according to claim 21, wherein said selecting circuit transfers the output signal of said low pass filter to said network when both first and second enable signals are in a "high" or "low" state, and does not transfer the output signal of said low pass filter to said network when said first enable signal and said second enable signal are in a different state from each other.

24. The cable modem according to claim 21, wherein said selecting circuit is comprised of:
an exclusive NOR circuit for receiving said first and second enable signals and performing an exclusive NOR operation; and
a switching circuit for receiving an output signal of said exclusive NOR circuit and the output signal of said low pass filter, and under the control of the output signal of said exclusive NOR circuit, selectively transferring the output signal of said low pass filter to said network.

25. The cable modem according to claim 24, wherein the switching circuit is comprised of:
an n-channel metal-oxide semiconductor transistor having a gate terminal to which the output signal from said exclusive NOR circuit is applied, and a source terminal connected to a ground;

a resistor, of which one end being connected to the ground; and a relay having a first terminal connected to a drain terminal of said n-channel metal-oxide semiconductor-type transistor, a second terminal connected to said resistor, a third terminal connected to a supply voltage, a fourth terminal to which the output terminal of said low pass filter is connected, and a fifth terminal to which an output terminal of said switching circuit is connected.

26. The cable modem according to claim 25, wherein the resistance is 75 Ω(ohms).

27. The cable modem according to claim 21, wherein said network is a hybrid fiber coaxial network.

28. A method of a cable modem, comprising:
controlling said cable modem, by a control unit, generating a first enable signal and a second enable signal, and outputting data to a data bus;
receiving by a programmable gain controller, under the control of said first enable signal a modem signal, adjusting gain, and generating a modem signal with adjusted intensity;
receiving by a transformer, an output signal of said programmable gain controller and isolating said programmable gain controller from a next stage;
receiving by a low pass filter, an output signal of said transformer and filtering off high-frequency elements; and
receiving said first and second enable signals and an output signal of said low pass filter by a selecting circuit, and under the control of said first and second enable signals, selectively transferring the output signal of said low pass filter to a network.

29. The method according to claim 28, further comprising:
receiving by a tuner, an output signal of said selecting circuit and transferring the output signal to said network.

30. The method according to claim 29, wherein said selecting circuit transfers the output signal of said low pass filter to said network when both first and second enable signals are in a "high" or "low" state, and does not transfer the output signal of said low pass filter to said network when said first enable signal and said second enable signal are in a different state from each other.

31. The method according to claim 30, wherein said receiving by selecting circuit is comprised of:
receiving by an exclusive NOR circuit, said first and second enable signals and performing an exclusive NOR operation; and
receiving by a switching circuit, an output signal of said exclusive NOR circuit and the output signal of said low pass filter, and under the control of the output signal of said exclusive NOR circuit, selectively transferring the output signal of said low pass filter to said network.

32. A computer-readable medium having computer-executable instructions for performing a method, comprising:
controlling a cable modem, by a control unit, generating a first enable signal and a second enable signal, and outputting data to a data bus;
receiving by a programmable gain controller, under the control of said first enable signal a modem signal, adjusting gain, and generating a modem signal with adjusted intensity;
receiving by a transformer, an output signal of said programmable gain controller and isolating said programmable gain controller from a next stage;
receiving by a low pass filter, an output signal of said transformer and filtering off high-frequency elements; and
receiving said first and second enable signals and an output signal of said low pass filter by a selecting circuit, and under the control of said first and second enable signals, selectively transferring the output signal of said low pass filter to a network.

33. A computer-readable medium having stored thereon a data structure comprising:
a first field containing data representing controlling by a first unit an entire cable modem, generating a first enable signal and a second enable signal, and outputting data to a data bus;
a second field containing data representing receiving a modem signal, adjusting gain, and generating a modem signal with adjusted intensity under the control of said first enable signal; and
a third field containing data representing receiving said first and second enable signals and the modem signal with adjusted intensity, and under the control of said first and second enable signals, selectively transferring the modem signal with adjusted intensity to a network, with said third field further comprising:
a first sub-field containing data representing receiving said first and second enable signals in a second unit and outputting a signal in a high state only when both first and second enabling signals are in a high state; and
a second sub-field containing data representing receiving the output signal of said second unit and the modem signal with adjusted intensity, and under the control of the output signal of said second unit, selectively transferring the modem signal with adjusted intensity to said network.

* * * * *